United States Patent [19]

Phillips et al.

[11] 4,271,278
[45] Jun. 2, 1981

[54] CATHODE MATERIALS

[75] Inventors: Gary M. Phillips, St. Paul; Darrel F. Untereker, Cedar, both of Minn.

[73] Assignee: Medtronic, Inc., Minneapolis, Minn.

[21] Appl. No.: 74,153

[22] Filed: Sep. 10, 1979

Related U.S. Application Data

[63] Continuation-in-part of Ser. No. 951,862, Oct. 16, 1978, Pat. No. 4,223,110.

[51] Int. Cl.³ .............................. C08F 8/18; C08F 8/22
[52] U.S. Cl. .................................. 525/356; 429/213; 525/336
[58] Field of Search .................. 525/356, 336; 429/213

[56] References Cited

U.S. PATENT DOCUMENTS

| | | | |
|---|---|---|---|
| 2,754,245 | 7/1956 | Hosmer | 525/356 |
| 3,136,755 | 6/1964 | Grosser et al. | 525/356 |
| 3,773,557 | 11/1973 | Mead | 136/83 R |
| 3,817,791 | 6/1974 | Greatbatch et al. | 136/83 R |
| 3,895,962 | 7/1975 | Mead | 136/83 R |
| 4,010,043 | 3/1977 | Schneider | 136/83 R |
| 4,027,083 | 5/1977 | Aerrle et al. | 525/356 |
| 4,128,703 | 12/1978 | Mead et al. | 429/213 |
| 4,157,433 | 6/1979 | Phillips | 525/356 |
| 4,223,110 | 9/1980 | Phillips et al. | 525/356 |

OTHER PUBLICATIONS

"The Lithium–Iodine Cell" Kraus et al., (Schneider), pp. 144–147, (1976), Power Source Sym.

Primary Examiner—William F. Hamrock
Attorney, Agent, or Firm—Schroeder, Siegfried, Ryan, Vidas, Steffey & Arrett

[57] ABSTRACT

Preparation and use of polyvinylpyridine and iodine (PVP.n $I_2$) as cathode materials for electrochemical cells.

15 Claims, 2 Drawing Figures

CATHODE MATERIALS

DESCRIPTION

1. Background of Prior Art

This is a continuation-in-part of copending patent application Ser. No. 951,862, filed Oct. 16, 1978, for Improved Cathode Materials (now issued as U.S. Pat. No. 4,223,110, dated Sept. 16, 1980). This continuation-in-part is assigned to the same assignee as the parent case i.e., Medtronic, Inc.

Batteries, such as those of the lithium/iodine type for example, sometimes referred to as solid state cells, make use of a cathode material comprised of iodine and an iodine containing charge transfer compound. Charge transfer compounds are sometimes referred to as complexes and sometimes as donor-acceptor compounds. The iodine in such a cathode reacts electrochemically with the lithium anode to provide a voltage output. This reaction causes a lithium iodine electrolyte to form in situ between the anode and cathode. The charge transfer donor typically used is a polyvinylpyridine, (PVP) such as poly-2-vinylpyridine (P2VP) or poly-4-vinylpyridine (P4VP). Additional amounts of free iodine i.e., excess iodine which is not combined with the charge transfer donor, are usually included as part of the cathode material to provide an iodine "reservoir" for the battery to draw on during discharge. The additional iodine increases the useful life of the battery.

The polyvinylpyridine-iodine cathode compositions previously used, such as the P2VP and/or P4VP based cathodes, have exhibited conductivities which degrade severely with the addition of relatively large amounts of iodine to the complex. Such amounts of iodine are hereinafter referred to as "excess iodine." The degradation in the conductivity of the composition has been found to effectively limit the amount of iodine which can be included in these compositions without degrading the conductivity of the material below a useful level. As a result, the previously available polyvinylpyridine cathode materials have not had as high an energy density as is theoretically expected from an iodine based system. This fact is particularly important for the application of these cathode materials to implantable medical devices, eg., heart pacemakers, for example. Copending U.S. Patent application Ser. No. 901,506, filed May 1, 1978, Cathode Materials and also assigned to Medtronic, inc., (now U.S. Pat. No. 4,157,433) provides excess iodine containing polyvinylpyridine-iodine cathodes, P2VP and/or P4VP based, and methods for preparing the same. The cathodes have markedly higher conductivity than has been heretofore attained. That patent application also discloses the preparation of useful cathode materials having much higher iodine content, such as materials having a final mole ratio of 20:1 or greater overall iodine to P2VP and/or P4VP donor components. These improved materials possess higher energy densities and longer useful life. The complete content of that patent application is incorporated herein by reference.

Specifically, aforementioned U.S. Pat. No. 4,157,433 is directed to cathode materials and provides methods of preparing cathode materials from P2VP, P4VP or mixtures thereof with varying amounts of iodine. As a part of the method it is required that at least a part of the preparation take place at temperatures in excess of about 225° C. in a sealed container in order to obtain the improved conductivities, which are characteristic of the materials disclosed in that application.

In one form of the methods disclosed in the copending application, following preparation of a highly conductive cathode material at elevated temperature, excess iodine is then added. The iodine is added at room temperature and in amounts to provide a final mole ratio of about 20:1 or higher cathode material, if desired. For example, a final mole ratio of 40:1 material may be prepared in this manner. Lesser amounts may also be used.

In another form of the methods disclosed in the copending application, a one-step technique is used to prepare the cathode material, which may have a mole ratio of 20:1 or higher, directly by initially adding the desired ultimate amount of iodine to the mixture being prepared. In this embodiment the desired relative final amounts of P2VP and P4VP donor and iodine are simply mixed together and heated to a temperature in excess of about 225° C.

Herein, "mole ratio" is defined in terms of the number of moles (n) of iodine ($I_2$) to the number of gram formula weights of vinylpyridine in the initial polymer-donor mixture. For example, a mixture which initially contains 508 grams of $I_2$ and 10.5 grams of PVP would have a mole ratio of 20:1 and would be designated as PVP.20 $I_2$. "mole fraction" is defined in an analogous manner as $n/n+1$, according to the above nomenclature.

For descriptive purposes herein, the term "complex" refers to any single phase iodine and donor mixture. The term "cathode material" refers to a material composed of a "complex" and may include excess iodine, which may be present as a solid phase.

SUMMARY OF THE INVENTION

This invention provides batteries which make use of a material prepared by modification of the methods disclosed in the aforementioned U.S. Pat. No. 4,157,433. The modified method significantly lowers the corrosion type of these cathode materials. Generally, according to this invention, the use of vacuum or inert atmospheres, collectively referred to herein as a "protective atmospheres," at some time preparation of the cathode materials, has been found to lower their corrosion rate. Helium and argon are preferred inert atmospheres. Consequently, batteries using the improved material are benefited.

DESCRIPTION OF PREFERRED EMBODIMENTS

Figure 1:
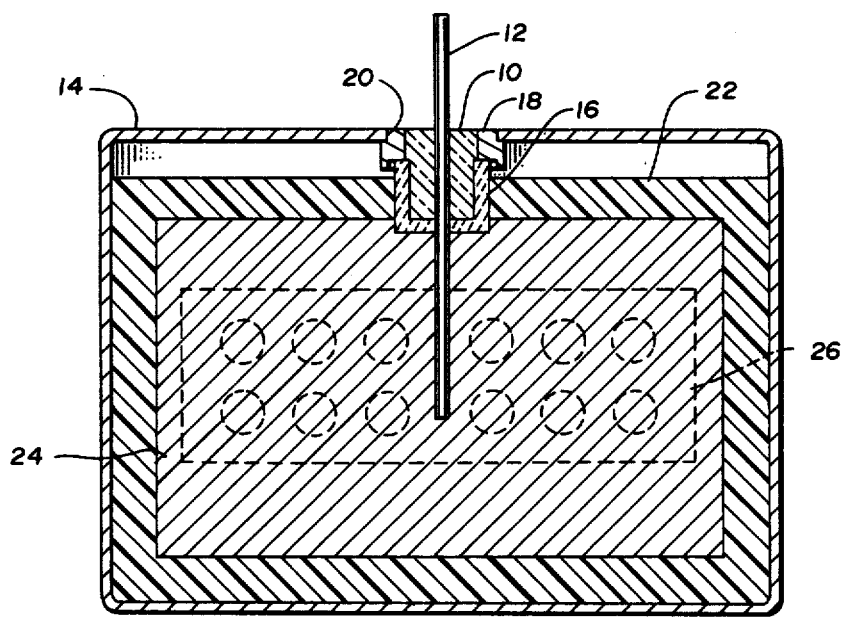
FIGS. 1 and 2 show an illustrative electrochemical cell of the lithium/iodine type in cross section, front and end elevations, respectively.
Figure 2:
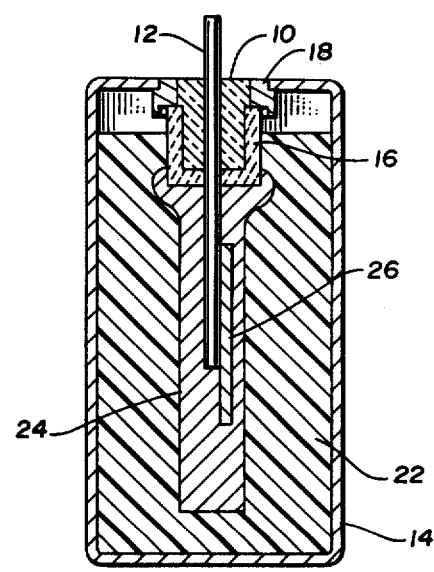

As is disclosed in the aforementioned U.S. Pat. No. 4,157,433, the conductivity (measured at 37° C.) of cathode material samples of P2VP.3.3 $I_2$ (mole ratio) mixture varies with the heating temperature used for its preparation. Heating is accomplished in a sealed container. Heating at 175° C. produces material having a conductivity no higher than about $4 \times 10^{-3}$ reciprocal ohm-cm even for very extended heating periods. On the other hand, heating at about 225° C. produces a material having a conductivity (at 37° C.) of about $7 \times 10^{-3}$ reciprocal ohm-cm for heating times greater than about 10 hours. Heating at even higher conductivities and less heating time is required to obtain improved conductivity as the heating temperature is increased above about 225° C.

Other mole ratios of iodine mixed with P2VP donor behave in a similar manner i.e., heating above about 225° C. provides higher conductivity, as is also illustrated in the copending application. However, the mole ratio should be at least 1:1. Preferred P2VP.n I$_2$ cathode materials have a conductivity higher than about $1.5 \times 10^{-3}$ reciprocal ohm-cm and a mole ratio of at least about 12:1. This is readily accomplished at heating temperatures of about 225° C. or higher and at mole ratios on the order of 20:1.

Materials using a P4VP donor component behave similarly to those using a P2VP donor component. This is also illustrated by the copending application Ser. No. 901,506, which shows the conductivities of 3.3:1 mole ratio cathode materials made up from P2VP and P4VP donor materials with four hours reaction at heating temperatures of 150° C. and 320° C. All of the data indicate that P2VP and P4VP behave analogously in this regard.

Mixtures of P2VP and P4VP donor material may also be prepared and used. For example, a mixture of equal parts P2VP and P4VP was used to prepare a 3.3:1 mole ratio cathode material. The material prepared at 320° C. for four hours had a conductivity of $1.1 \times 10^{-2}$ reciprocal ohm-cm.

High conductivity in the cathode material is necessary because, as already pointed out, high additional amounts of iodine added to the material degrades its conductivity. By providing a high initial conductivity in the material, larger amounts of iodine can be added thereto without degrading the final conductivity of the resultant material to a low undesirable value. With higher mole ratios, one can expect to maintain a conductivity of about $10^{-3}$ reciprocal ohm-cm or better with the above described techniques while also obtaining a much improved deliverable energy density than has been heretofore possible. As is disclosed in the copending application Ser. No. 901,506, a P2VP.20 nI$_2$ cathode material prepared at higher temperatures, as described above, and tested in a battery having a lithium anode provided about 90% of stoichiometric capacity to a 2.0 Volt cut-off at 3μA/cm$^2$ load. The cathode material was prepared by heating a mixture of P2VP.3.3 I$_2$ to 300° C. for about four hours in a sealed glass container. Upon cooling, excess iodine was added to the material to provide a final mole ratio of P2VP.20 I$_2$.

There are two ways to incorporate the excess iodine into the material. In the first and presently most preferred form, the polyvinylpyridine polymer component is mixed with a relatively low amount of iodine, such as 3.3 mole ratio or less, ie., enough to merely form a single phase cathode material with little or no excess iodine. The mixture is heated in excess of about 225° C. for a predetermined period of time, dependent upon the temperature selected, to form material of improved conductivity. For example, heating a 3.3 mole ratio sample at about 225° C.–320° C. for about one hour produces material of improved conductivity as is shown in the aforementioned U.S. Pat. No. 4,157,433. An 8 hour reaction time appears to be adequate to assure complete reaction at various temperatures above about 225° C. However, longer times may be used. An additional amount of iodine may then be added at any convenient temperature ie., room temperature or elevated, to provide any desired excess amount in the final cathode material resulting from this preparation.

As can be seen from the above, highly conductive materials may be prepared from P2VP, P4VP or mixtures thereof ie., P2VP.nI$_2$ and/or P4VP.nI$_2$ where n (indicative of mole ratio) may range from about 1.0 to 3.3. A preferred value for n is 3.3 in the case of P2VP and iodine. Such a preferred composition will exhibit a conductivity on the order of $4 \times 10^{-3}$ reciprocal ohm-cm or higher. Optionally, additional iodine may be added.

As is noted above, based on the aforementioned U.S. Pat. No. 4,157,433, cathode materials may be prepared by heating at 250° C. for about 8 hours. Upon cooling and measuring the conductivity thereof at 37° C., these materials exhibit a conductivity on the order of $10^{-2}$ reciprocal ohm-cm or greater. If a higher temperature eg., 320° C. is used, the time for heating can be shortened to a time on the order of an hour or so and a 37° C. conductivity on the order of $10^{-2}$ reciprocal ohm-cm can still be attained or exceeded. The 37° C. temperature at which conductivity is measured for samples discussed herein was selected arbitrarily. Other temperatures may be used for measuring the conductivity of these materials so long as any selected temperature is used consistently for purposes of comparison between samples.

Heating temperatures in excess of 350° C. show no substantial increased benefit as to heating time in attaining the high conductivity levels as is shown in U.S. Pat. No. 4,157,433. From a practical standpoint, heating at temperatures in excess of this level appears to be of no practical benefit. P4VP based compounds can be prepared over the same temperature range as those of P2VP.

Upon cooling to room temperature, following the above method of preparation, the high conductivity P2VP, P4VP, or mixed P2VP/P4VP cathode material will be more or less fluid depending on the amount of iodine included therein and the temperature to which they were heated.

Thus, in order to prepare a high energy density cathode material for battery use, it is only necessary to mix an amount of additional iodine with a material prepared in the above described manner. Preferably, the iodine is ground into a convenient powder form for this purpose. Elevated temperatures may be used for mixing the iodine with the material but are not necessary. The amount of additional iodine may be selected to provide any desired final mole ratio relative to the P2VP and/or P4VP organic constituents. In the case of batteries for implantable medical devices, it is preferred that the final mole ratio be at least on the order of 12:1.

For example, using a P2VP.3.3 I$_2$ material prepared according to the above technique, having a conductivity in excess of $10^{-2}$ reciprocal ohm-cm and being fluid in form, powdered iodine was added thereto in sufficient quantity to provide a material having a final mole ratio of about 20:1. The resultant cathode material was of a wet sand-like consistency and dark appearance. It was pressed to a density of about 4.7 g/cc and used in a battery.

The aforementioned U.S. Pat. No. 4,157,433 describes a second method of preparation in which highly conductive cathode materials are prepared ranging over various iodine mole ratios by simply including the desired final amount of iodine in the heating container with the polyvinylpyridine polymer, sealing the container and heating it to a temperature greater than 225° C. for a predetermined time dependent on the selected temperature.

The table shows the conductivity of several samples of 20:1 mole ratio cathode materials prepared according to one or the other of the two preparation techniques described above.

The first four cathodes were prepared by the first technique or the two-step method using initial mole ratios between 1:1 and 6.2:1 and diluting with additional iodine to provide the final 20:1 mole ratio.

The table also shows a sample prepared according to the second technique, sufficient iodine being added initially, prior to heating at reaction temperature, to result in a cathode material having a final 20:1 mole ratio. As can be seen, all samples had conductivities between 1.2 and $2.1 \times 10^{-3}$ reciprocal ohm-cm.

TABLE

| Reaction Temperature Composition* (Mole Ratio $I_2$:P2VP) | Conductivity of Final P2VP . 20 $I_2$ at 37° C. (ohm-cm)$^{-1}$ |
|---|---|
| 1:1 | $1.25 \times 10^{-3}$ |
| 2.1:1 | $1.39 \times 10^{-3}$ |
| 3.3:1 | $1.75 \times 10^{-3}$ |
| 6.2:1 | $2.05 \times 10^{-3}$ |
| 20:1 | $1.56 \times 10^{-3}$ |

*Reaction time 4 hours at 320° C.

As already indicated, it has been determined that the above described materials may in some instances tend to be somewhat corrosive, such as when used with stainless steel and other iron based electrochemical cell components. In accordance with this invention, it has been discovered that the use of a protective atmosphere, ie., a vacuum or inert atmosphere, during preparation of these materials results in a material which exhibits significantly lower corrosion rates. The above described methods of preparation are merely modified to preferably include the establishment of a vacuum or an inert atmosphere in the sealed container prior to heating the material to its reaction temperature and may include exposure of the material, following its preparation, to a vacuum to remove volatiles. The use of vacuum steps both before and after heating is preferred. Also, the use of ambient atmosphere during heating followed by short-time vacuum removal of unwanted volatiles will provide the benefits of this invention. By short-time, something less than about one hour is meant at vacuum levels of about 1 mm Hg to about 100 mm of Hg.

The components of the materials and the reaction temperatures and times for the methods of preparation are not changed from the aforementioned U.S. Pat. No. 4,157,433. For example, iodine and P2VP were mixed together in the amounts required to form a final 3.3:1 mole ratio. The mixture was placed in a glass container which was evacuated to about 1 mm of Hg. The container was sealed and the contents heated to 300° C. for 3 hours. The resultant material provided the following conductivity results:

| 18° C. - $1.95 \times 10^{-3}$ | (ohm-cm)$^{-1}$ |
|---|---|
| 37° C. - $7.31 \times 10^{-3}$ | (ohm-cm)$^{-1}$ |
| 60° C. - $1.83 \times 10^{-3}$ | (ohm-cm)$^{-1}$ | whereas it had a corrosion rate of only $8.00 \times 10^{-4}$ inches/year as compared to $2.00 \times 10^{-2}$ inches/year for some of the materials described in the U.S. Pat. No. 4,157,433.

As a second example, a 100 gram mixture having a 3.3:1 mole ratio was prepared as described in example immediately above except that the heating temperature was 320° C. and the heating time was 4 hours. The resultant fluid had a corrosion rate of $3.0 \times 10^{-4}$ inches/year. Conductivity was:

| 18° C. - $2.93 \times 10^{-3}$ | (ohm-cm)$^{-1}$ |
|---|---|
| 37° C. - $1.04 \times 10^{-2}$ | (ohm-cm)$^{-1}$ |
| 60° C. - $2.25 \times 10^{-2}$ | (ohm-cm)$^{-1}$ |

In a third example, a 3.3 mole ratio mixture was prepared by mixing appropriate amounts of iodine and P2VP in air. This mixture was sealed into a glass container with the ambient entrapped air and heating at 320° C. for 4 hours. Following heating, the container was evacuated for about ½ hour for the removal of unwanted volatiles. The conductivity of the resultant material was similar to the second example described immediately above the corrosion rate was $9.3 \times 10^{-3}$ inches/year.

A last example was prepared as above, except the mole ratio was 20:1. Its corrosion rate was $2 \times 10^{-3}$ inches/year.

Corrosion rates were measured on 304 L stainless steel by the technique of calorimetry. The heat given off via the corrosion reaction was measured and interpreted in terms of a corrosion rate. The heat of corrosion of 304 L stainless steel was calculated from the heats of formation of the corrosion products assuming the average composition of the stainless steel to be 65%Fe, 20%Cr and 12%Ni and the corrosion products to be $FeI_2$, $CrI_2$ and $NiI_2$.

FIG. 1 is illustrative of an electrochemical battery construction utilizing the cathode materials described herein. This particular battery is of the lithium/iodine type and includes a container or casing 14 which is preferably of stainless steel. The casing has an opening generally indicated at 20 into which an electrical feedthrough is hermetically sealed. The peripheral metal portion 18 of the feedthrough is welded to casing 14 as shown and the glass is sealed by fusing to metal portion 18. The contents of the cell include a cathode 22, as described herein, which preferably takes the form usually of a pasty or pliable material comprising of the poly-2-vinylpyridine complexed with iodine as described herein to form an organic-iodine complex compound. Additional amounts of free iodine may also be included in such a material. As shown in FIG. 1, contact between cathode 22 and metal casing 14 provides for electrical battery cathode contact. The anode 24 of the cell preferably consists of a body of lithium metal incorporating an anode collector 26 which is connected to leadwire 12 as shown although other cathode materials may be used. Ceramic cover 16 interiorly shields glass 10 from the contents of the cell, particularly from the lithium anode 24, which tends to displace sodium in the glass seal or otherwise chemically attack it.

Preferably, the ceramic for cover means 16 is alumina which has been found to function very satisfactorily with glass and with metal from the standpoint of thermal expansion.

Examples of PVP which may be used with this invention are shown below. PVP from other sources will also be satisfactory.

P2VP may be synthesized as follows:

Benzoyl peroxide (2.0 grams) is dissolved in freshly distilled 2-vinylpyridine (200 grams). water (400 ml) is added and the mixture is purged with nitrogen for 1 hour. With continued purging, the mixture is heated at 85° C. with stirring and kept at that temperature for two hours. The organic phase will thicken and develop a brown color during this time. The mixture is cooled; the aqueous phase is discarded and the organic phase is dried overnight at 60° C. in a vacuum oven. The residue is ground into fine granules and dried to a constant weight at 60° C. in the vacuum oven. Yield 162 gm (81%) poly-2-vinylpyridine. This product can be expected to provide the following results upon analysis by gel permeation chromatography:

Number-average molecular weight—199,000

Weight-average molecular weight—555,000

P2VP obtained from the Ionac Chemical Co., Birmingham, Ala. was also satisfactory: typical weight-average molecular weight: 301,000; typical Number-average molecular weight: 128,000.

P4VP may be synthesized as follows:

Freshly distilled 4-vinylpyridine is purged with nitrogen for one hour. The 4-vinylpyridine is heated with stirring under a continuing nitrogen purge to 160° C. and maintained at that temperature for 90 minutes. The contents of the reactor will darken and thicken during this time until agitation becomes very difficult to maintain. The reaction product is then poured warm into a container for storage and tightly sealed.

The product can be expected to provide the following results upon analysis by gel permeation chromatography:

%volatiles (probably monomer)—34%

Weight-average molecular weight—6000 (includes monomer).

P4VP obtained from Polysciences, Inc., identified as #0112 was also satisfactory.

Having described the invention, the embodiments hereof in which exclusive property right is claimed are defined in the following claims.

1. A cell including an anode and a cathode wherein the cathode is prepared by a method comprising the steps of mixing polymeric material selected from the group consisting of P2VP, P4VP, and mixtures thereof with a quantity of iodine and heating the resultant mixture in a sealed container in the presence of a protective atmosphere at a temperature of at least about 150° C.

2. The cell of claim 1 wherein the protective atmosphere is a vacuum.

3. The cell of claim 1 wherein the atmosphere is inert.

4. The cell of claim 1 wherein the heating temperature is in excess of about 150° C.

5. The cell of claim 1 wherein the heating temperature is between about 150° C. and 350° C.

6. The cell of claim 1 wherein the heating temperature is in excess of about 350° C.

7. The cell according to any of the preceding claims 1, 2, 3, 4, 5 or 6 wherein additional iodine is added to the material following the heating step.

8. The cell according to claim 1 wherein the anode includes lithium.

9. A cell including an anode and a cathode wherein the cathode is prepared by a method of comprising the steps of mixing polymeric material selected from the group consisting of P2VP, P4VP and mixtures thereof with a quantity of iodine, and heating the mixture in a container, the heating step being further characterized by a treatment sequence selected from the group consisting of:

A. sealing the mixture in the container under vacuum and heating the mixture for a time at a temperature of at least about 150° C., B. sealing the mixture in the container with an inert atmosphere and heating the mixture for a time at a temperature of at least about 150° C., and C. sealing the mixture in the container with an atmosphere selected from the group consisting of ambient, inert, and vacuum, heating the mixture for a time at a temperature of at least about 150° C., and subjecting the mixture to a vacuum for a time following the heating step to remove volatiles.

10. The cell of claim 9 wherein additional iodine is added to the material following the heating step.

11. The cell of claim 9 wherein the heating temperatures are in excess of about 225° C.

12. The cell of claim 9 wherein the heating temperatures are between about 150° C. and 350° C.

13. The cell of either of the preceding claims 1 or 9 wherein the inert atmosphere is selected from the group consisting of argon, helium and mixtures thereof.

14. The cell of either of the preceding claims 1 or 9 wherein the time of heating is less than about eight hours.

15. The cell of either of the preceding claims 13 or 14 wherein additional iodine is added to the material following the heating step.

* * * * *